Aug. 19, 1941.  F. W. PULLEN  2,253,348
PAN DUMP MECHANISM
Filed May 13, 1940
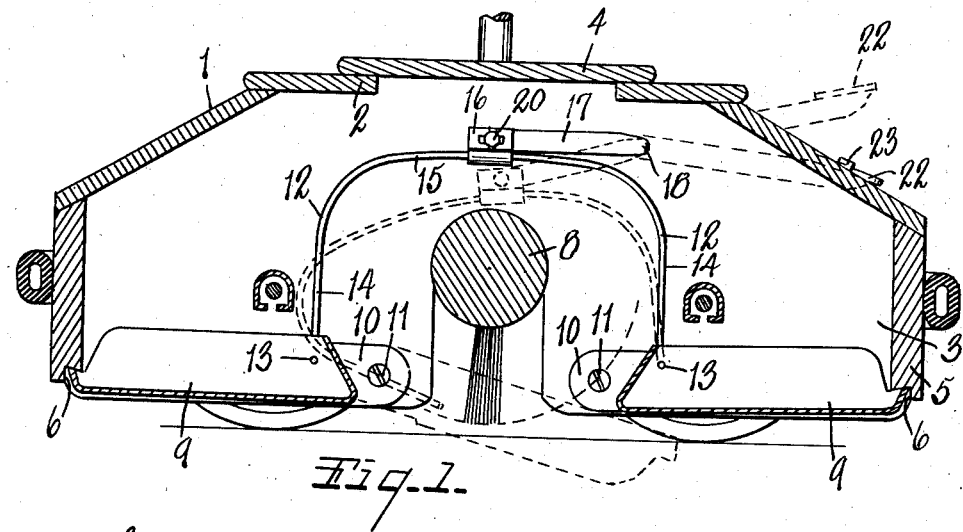
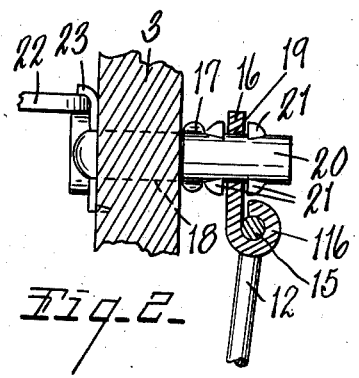
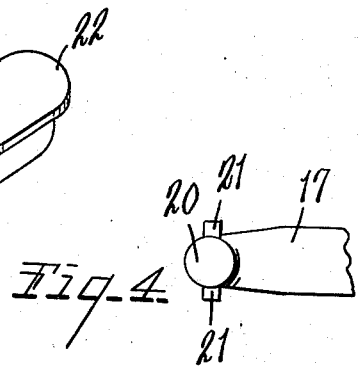
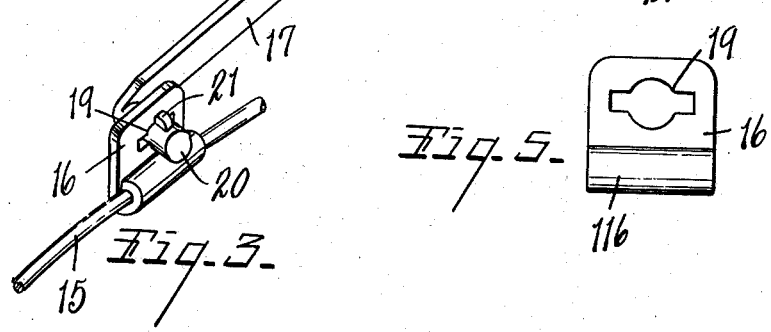
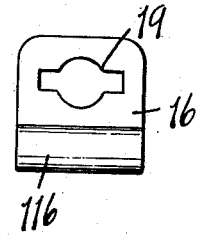
INVENTOR.
FRED W. PULLEN
BY Earl & Chappell
ATTORNEYS.

Patented Aug. 19, 1941

2,253,348

UNITED STATES PATENT OFFICE 2,253,348

PAN DUMP MECHANISM

Fred W. Pullen, Grand Rapids, Mich., assignor to Bissell Carpet Sweeper Company, Grand Rapids, Mich.

Application May 13, 1940, Serial No. 334,783

5 Claims. (Cl. 15—41)

This invention relates to improvements in pan dump mechanisms.

This invention relates to carpet sweepers and particularly to the dust pan holding and dumping mechanism. It is related to my co-pending application Serial No. 249,012, filed January 3, 1939, for Pan dump mechanism, now Patent 2,221,107.

It has for its objects:

First, to provide a simple and effective dust pan dumping mechanism for carpet sweepers which may be made inexpensively and which is highly effective in use.

Second, to provide such a mechanism in which the dust pans are held resiliently in closed position to eliminate rattling thereof during operation and which may be dumped by merely releasing the mechanism without having to exert force on the pans for this purpose and in which when the pans are in dumping position it is difficult to injure the pans or the dumping mechanism by bending the pans beyond dumping position.

Other objects and advantages pertaining to details and economies of construction and operation will appear from the description to follow. The invention is defined in the claims. A preferred embodiment of my invention is illustrated in the accompanying drawing, in which:

Fig. 1 is a sectional view through a carpet sweeper embodying my invention and showing the dust pans in closed position in full lines and one of the pans in opened and bent back position in dotted lines.

Fig. 2 is a detail sectional view taken on line 2—2 of Fig. 1.

Fig. 3 is a fragmentary view of the dump lever and the connection to the dust pan spring.

Fig. 4 is a partial detail view of the end of the dump lever.

Fig. 5 is a side elevation of the connecting means for connecting the dump lever with the pan springs.

The carpet sweeper 1 has a case 2 made up of a pair of ends 3, only one of which is shown, a top 4 and sides 5 which extend lengthwise of the case and are notched at 6 to provide stops against which the pans of the carpet sweeper close. Suitable wheels 7 and a brush 8 are provided. The dust pans 9 extend lengthwise of the case and are spaced from one another, one pan extending along each side of the bottom of the case to close the same.

Adjacent the ends of the inner edges of the pans 9 are provided ears 10 which are apertured to receive pivots 11 on the end of the case. The pans are pivoted on these pivots so that they may be swung from the closed position shown in full lines in Fig. 1 to a downward open dumping position. For actuating the pans for dumping them and for holding them resiliently in closed position, I provide a pan closing member 12 which has its ends 13 pivoted in the ends of the pans at points spaced from the pivots 11 outwardly toward the edges of the case. Substantially vertical arms 14 extend upwardly from the pans to a substantially horizontal connecting portion 15 which connects the arms 12. The entire member may be made of spring wire as shown.

Because of the shape of the member 12, it has sufficient resiliency to permit a flexing as the pans move from open to closed position. Centrally of the horizontal portion 15 of the spring member 12, I provide connecting means 16 which are provided with a loop 116 through which the horizontal portion 15 of the member 12 passes, so that the member 16 is slidably connected to the member 12 so that the member 12 may slide therethrough. The member 16 is connected to one end of a dump lever 17 which is pivoted between its ends at 18 to one end of the case by means of a key-hole slot 19 into which the end 20 of the lever 17 fits, the lugs 21 being so positioned that although in disassembled relationship they can pass through the key-hole slot, in assembled relationship they hold the parts together.

At the free end of the lever 17, I provide a plate 22 to be engaged by the finger of the user when it is desired to dump the dust pans.

The spring member 12 and the lever 17 are so arranged that when the lever 17 is moved to the down position shown in Fig. 1, the member 12 raises the pans to closed position where their outer edges engage the stops 6. The spring is then flexed by further downward movement of the lever 17, which permits the lever to move under a catch 23. The tension of the spring member 12 holds the pans tightly and resiliently in position so that they will not rattle and also holds the lever in resilient engagement with the catch 23 so that the lever will not be jarred from the catch.

When it is desired to dump the dust pans of the carpet sweeper, a slight pressure on the plate 22 of the handle 17 releases it and permits it to swing to the dotted line position shown in Fig. 2. This permits the dust pans to swing downwardly so that the litter collected in the use of the sweeper may be dumped therefrom. The spring does not exert any material pan closing tension when the pans are down and if it should happen that the user of the sweeper were to set the sweeper down with the pans in dumping position, one of the pans might swing to the position shown in dotted lines in Fig. 1. In order to prevent injury to the pans and to prevent injury to the spring member 12, the sliding connection between the member 16 and the member 12 permits the member 12 to slide therethrough as shown in dotted lines in Fig. 1. The other pan will, of course, be swung to the closed position and the spring is free enough so that it does not receive a set which might be the case if the member 16 were connected solidly to the spring member 12. If the sweeper is then lifted from the floor, the pans will both fall to the down position and the member 12 will slide through the member 16 until it is substantially centered. The pans may then be closed as above described.

In making use of this sliding connection between the dump lever and the spring member 12, I eliminate a possible source of injury to the pan and the springs shown in my aforesaid co-pending application. The means for accomplishing this are entremely simple and have proven to be very effective in use.

The terms and expressions which have been herein employed are used as terms of description and not of limitation. There is no intention in the use of these terms and expressions of excluding any equivalents of the features shown and described. It is recognized that modifications are possible within the scope of the invention claimed.

Having thus described my invention, what I claim as new and desire to secure by Letters Patent is:

1. In a carpet sweeper having pivoted dust pans, the combination of a spring for holding said pans in closed position and releasable means for exerting tension on said spring whereby the pans are held resiliently in closed position, said spring being disposed to exert substantially no pan closing tension when said means are not exerting tension on said spring, whereby on release of said means said pans are free to open, and a slidable connection between said spring and said releasable means.

2. In a carpet sweeper having a case, the combination of a pair of spaced dust pans each extending along one side of the bottom of the case to close the same, stops on the case against which the pans rest in closed position, pivots on said case pivoting said pans adjacent the ends of their inner edges to permit the pans to swing downwardly from the bottom of the case, a spring having its ends pivoted to the ends of said pans at points spaced from the aforesaid pivots outwardly toward the edges of the case, said spring having a pair of substantially vertical arms connected by a substantially horizontal portion, a dump lever pivoted between its ends to the case, and connecting means slidable along the substantially horizontal portion of said spring and connecting one end of said dump lever to the horizontal portion of said spring and permitting a sliding movement of said spring relative to said end of said dump lever, and a catch on said case adapted to engage the free end of said lever to hold it in down position, said lever being so disposed that when it is in down position the pans are closed against said stops and said spring is tensioned to resiliently hold said pans in closed position and said spring being so disposed that on release of said lever said spring exerts substantially no pan closing tension, whereby the release of said lever from said catch permits the free end thereof to raise and said pans to swing downwardly free from pan closing spring tension to dump the sweeper and said spring is free to slide through said connecting means to permit one of the pans to be bent backwardly without putting a set in said spring.

3. In a carpet sweeper having a case, the combination of a pair of spaced dust pans each extending along one side of the bottom of the case to close the same, stops on the case against which the pans rest in closed position, pivots on said case pivoting said pans adjacent the ends of their inner edges to permit the pans to swing downwardly from the bottom of the case, a pan closing member having substantially vertically extending arms pivoted to the ends of said pans at points spaced from the aforesaid pivots outwardly toward the edges of the case, said member having a substantially horizontal spring portion, a dump lever pivoted between its ends to the case, and connecting means slidable along the substantially horizontal portion of said spring and connecting one end of said dump lever to said horizontal spring portion and permitting a sliding movement of said spring relative to said end of said dump lever, and a catch on said case adapted to engage the free end of said lever to hold it in down position, said lever being so disposed that when it is in down position the pans are closed against said stops and said spring portion of said pan closing member is tensioned to resiliently hold said pans in closed position and said spring being so disposed that on release of said lever said spring exerts substantially no pan closing tension, whereby the release of said lever from said catch permits the free end thereof to raise and said pans to swing downwardly free from pan closing spring tension to dump the sweeper and said spring is free to slide through said connecting means to permit one of the pans to be bent backwardly without putting a set in the spring.

4. In a carpet sweeper having a case, the combination of a pair of spaced dust pans each extending along one side of the bottom of the case to close the same, stops on the case against which the pans rest in closed position, pivots on the case pivoting the pans adjacent the ends of their inner edges to permit the pans to swing downwardly from the bottom of the case, a pan closing member having substantially vertically extending arms pivoted to the ends of said pans at points spaced from the adjacent pivots outwardly toward the edge of the case, said member having a substantially horizontal spring portion, and means on said case slidably engaging said horizontal spring portion and for raising said members and for exerting tension against the spring portion thereof to hold said pans resiliently in closed position, and a catch for ho'ding said means in pan closing position, said spring portion being so arranged that on release of said means from said catch said means exerts substantially no pan closing tension and is freely slidable through said means for raising said member.

5. In a carpet sweeper, the combination of dust pans and a pan closing member having a spring portion, means for moving said member to pan closing position and for exerting a tension on said spring portion to hold said pans resiliently to closed position, and a catch to hold said means in pan closing position, said spring portion being substantially flat and freely slidable through said means and so disposed that it exerts substantially no pan closing tension when said means are not exerting tension on said spring portion, whereby on release of said means from said catch said pans may move to dumping position and whereby movement of a pan beyond dumping position will cause said pan closing member to slide freely through said means.

FRED W. PULLEN.